Oct. 21, 1952  J. T. MULLEN  2,614,351
ADVERTISING DISPLAY DEVICE
Filed May 9, 1950  2 SHEETS—SHEET 1

INVENTOR.
James T. Mullen
BY Robb & Robb
Attorneys.

Oct. 21, 1952   J. T. MULLEN   2,614,351
ADVERTISING DISPLAY DEVICE
Filed May 9, 1950   2 SHEETS—SHEET 2
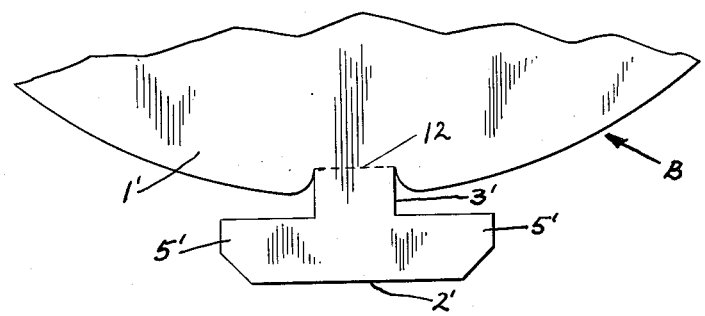
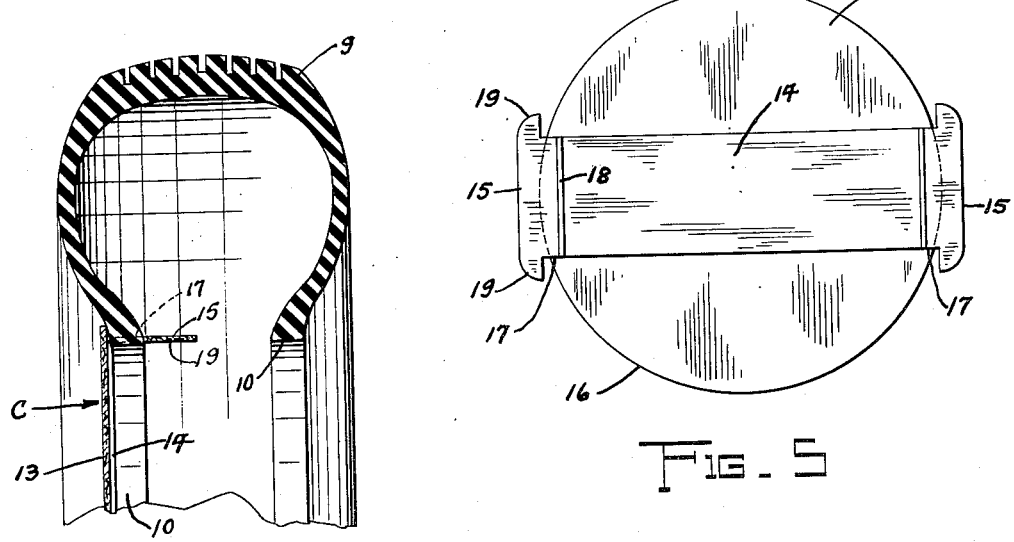
INVENTOR.
James T. Mullen
BY Robb & Robb
Attorneys.

Patented Oct. 21, 1952

2,614,351

UNITED STATES PATENT OFFICE 2,614,351

ADVERTISING DISPLAY DEVICE

James T. Mullen, Cleveland, Ohio, assignor to The Dyment Company, Cleveland, Ohio, a corporation Application May 9, 1950, Serial No. 160,945

4 Claims. (Cl. 40—125)

My present invention comprises a novel advertising display device adapted for quick attachment to and detachment from an article to be advertised thereby.

The advertising display device of my invention is designed particularly for the advertisement of tires such as used on automotive vehicles and is of a type commonly referred to as a tire display insert. Display devices of this type comprise a body portion, usually of substantially circular form which is adapted to fit into the dished central portion of the automotive tire, and upon which the advertising matter is carried. These tire display inserts of the type referred to, commonly include some means for attaching the same to the tire to prevent displacement when positioned as above indicated.

An important object of my invention is to provide a display insert of the type referred to in which the attaching means may be formed as a unitary part of the display body or which may be formed separately from the display body in a manner readily securable thereto.

Another object of my invention is to provide a display device of the type referred to having attaching means of extremely simple construction which enables attachment of the display device to the article to be advertised by an extremely simple mode of operation.

A further important object of my invention resides in the provision of a display device of the type referred to having attaching members which are simply bent at an angle to the plane of the body of the device and which, when the device is positioned in display position relative to the articles to be advertised, have a self-locking association therewith.

Another object of the invention is to provide a display device of the type referred to having the improved attaching means of my invention formed in its entirety from a single sheet of material by means of a stamping or die-cutting operation.

In accordance with my invention I provide a display device comprising a body portion formed of a flat sheet of material and a plurality of attaching members normally offstanding from the body portion and comprising T-shaped tab members, each having a neck portion movably connected to the display body inwardly of the periphery thereof. In attaching the display device to an automotive tire or like article the neck portions of the attaching members are bent at substantially right angles to the plane of the body portion, and then the display device is positioned so that the body portion rests against the bead of the tire with the attaching members extending inwardly of the latter and by means of light pressure applied to the body portion of the display device to press the same against the bead of the tire, the wing or ear portions of the attaching members readily spring into place behind the bead of the tire so as to have a self-locking action in connection therewith without need for manipulation thereof.

In the drawings:

Figure 4 is a plan view of a portion of a modified form of the display device of my invention.

Figure 5 is a plan view of another modification of a display device of my invention.

Figure 6 is a sectional view similar to Figure 2 but showing the modified form of display device depicted in Figure 5 in attached relation to the tire.

Figure 1:
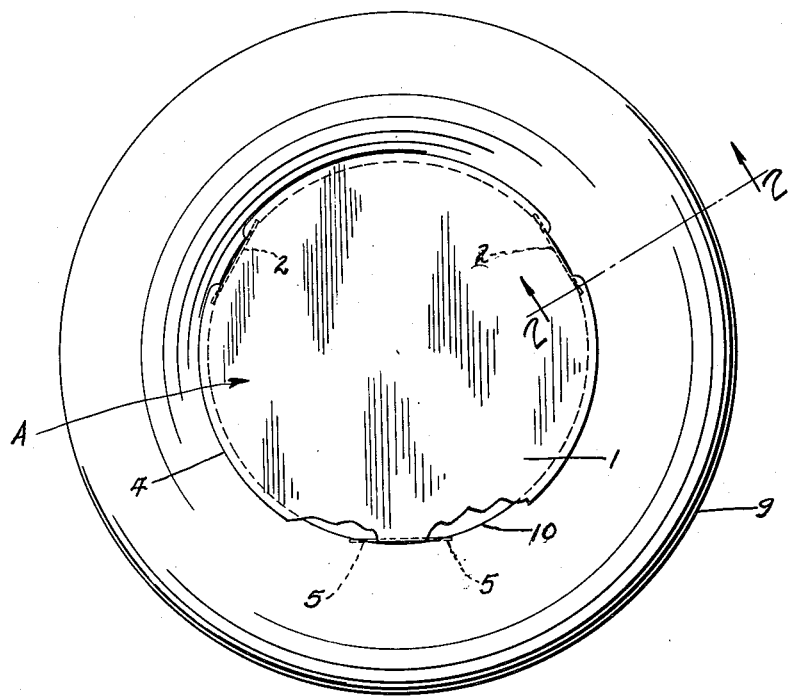
Figure 1 is a side elevation of an automotive tire showing the display device of my invention in attached relation thereto.
Figures 2, 3:
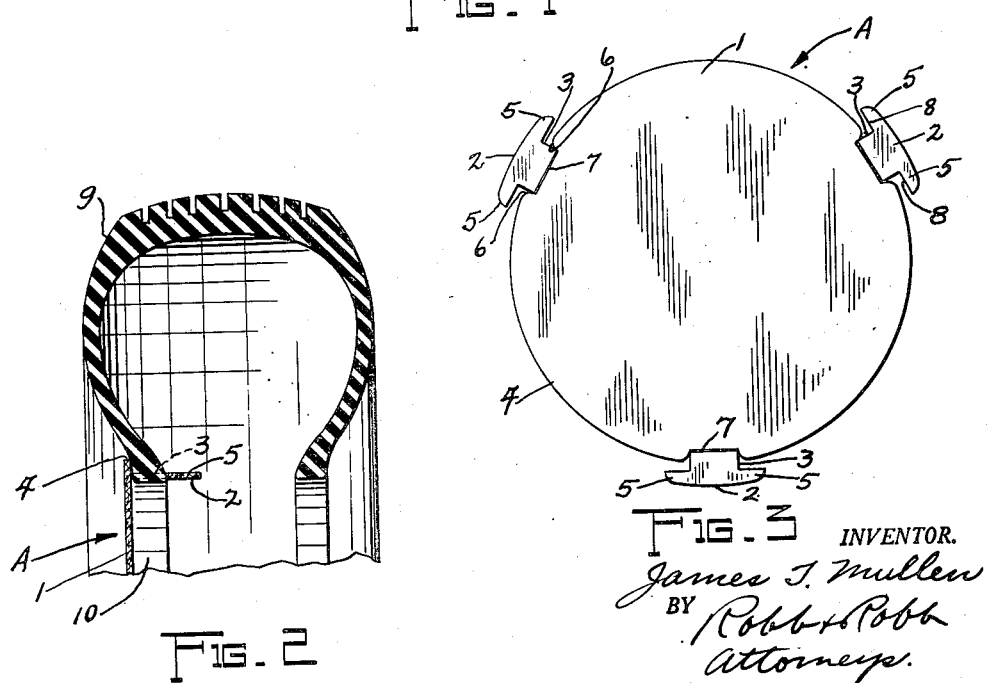
Figure 2 is a sectional view taken substantially on the line 2—2 of Figure 1.
Figure 3 is a plan view showing the display device alone in its initial condition before being placed in attached relation to the tire.

Referring first to Figures 1 to 3 inclusive, the display device there shown and generally designated by the letter A, comprises a single sheet of resilient material and includes a display body portion indicated by the numeral 1 adapted for display of advertising material thereon and attaching members indicated by the numeral 2, formed integrally with the body portion 1 and offstanding outwardly from the periphery thereof. In this form of the device the attaching members 2 are formed unitarily with the body portion 1, from the same piece of material, so that the body portion 1 and attaching members 2 comprise a unitary structure formed of a single piece of material. Each of the attaching members 2 comprises a T-shaped tab having a neck portion 3 extending from the body portion 1 outwardly beyond the periphery of the latter indicated by the numeral 4. Each of the attaching members 2 is provided with wings or ears 5 laterally offstanding from the neck 3 and spaced outwardly from the periphery 4 of the body 1 in the initial condition of the device A, which is the condition thereof before the attaching members 2 are bent relatively to the body 1.

The body 1 is cut away adjacent the periphery thereof at either side of each neck portion 3 of the attaching members 2, as indicated at 6, so that the neck portion 3 of each attaching member 2 extends inwardly of the periphery of the body 1 and merges with the body 1 inwardly of the periphery 4 thereof. The neck 3 of each attaching member 2 is foldable along its line of juncture with the body 1, so as to enable the neck 3 of each attaching member 2 to be bent at an angle to the plane of the body 1. To facilitate this objective the device A is preferably prescored as indicated at 7, along the line of juncture of the neck 3 of each attaching member 2 with the body 1.

The display device A may be conveniently formed of a single sheet of resilient material such as cardboard or the like, or it could be formed from a single sheet of relatively light or thin sheet metal or other suitable resilient sheet material. The forming of the display device A may be conveniently accomplished by a die-cutting operation so as to cut out the device A, including the body portion 1 and the attaching members 2, from a single sheet or blank of the material used.

The inner edges 8 of the ears or wings 5 of the attaching members 2 are preferably made parallel to a line tangential to the periphery 4 of the body 1 so that when the neck 3 of each attaching member 2 is bent at an angle to the plane of the body 1, the inner edges 8 of the ears or wings 5 will lie substantially parallel to the plane of the body 1.

In the use of the display device of my invention, the same may be shipped or transported to a point of use, in flat condiiton, substantially as indicated in Figure 3, and when it is desired to insert the display device A into a tire for advertising same, the attaching members 2 are bent relatively to the body 1 along the lines of juncture of the neck portion 3 with the body 1, said lines of juncture, in reference to the form of the device illustrated in Figures 1 to 3 inclusive, being indicated by the crease scores 7. In the aforesaid operation of bending the attaching members 2 relative to the body 1, the neck portions 3 are caused to be disposed substantially at right angles to the plane of the body 1, as seen best in Figure 2. When this is done, the device A may be readily interlockingly associated with an automotive tire 9, as indicated in Figure 2, by emplacing the device A adjacent the circular opening formed by the bead 10 of the tire 9 with the periphery 4 of the body 1 engaging the bead 10 of the tire, outwardly thereof, and the attaching members 2 having their neck portions 3 extending through the circular opening formed by the bead 10 so that the wing or ear portions 5 of the attaching members 2 lie inwardly of and extend behind the bead 10 of the tire 9. Due to the formation of the attaching members 2 in such a manner that the wing or ear portions 5 thereof cut across the arc of the circular periphery of the body 1, when the attaching members 2 are bent at an angle to the plane of the body 1 and the device is disposed as illustrated in Figure 2, it will be understood that the extremities of the ears or wing portions 5 will engage behind the bead 10 of the tire 9, inwardly thereof, so that the device A is locked to the tire by engagement of the periphery of the body 1 with the bead 10 of the tire, outwardly thereof, and the wings or ears 5 engaging the bead 10 of the tire, inwardly thereof. This operation of interlocking the extremities of the ears or wings 5 with the inner side of the bead 10 of the tire requires no manipulation of the ears or wings 5 after the device A is emplaced in relation to the tire 9 so that the wings 5 are disposed inwardly of the bead 10 of the tire. In the operation of inserting the device A in the circular opening formed by the bead 10 of the tire 9, after the attaching members 2 are bent at right angles to the plane of the body 1, the device is simply pushed to its position illustrated by Figure 2, requiring only slight manipulation of the neck portions 3 of the attaching members 2 to enable them to pass through the circular opening formed by the bead 10 of the tire and when the wing or ear portion 5 of the attaching member 2 have passed through the opening formed by the bead 10 of the tire, the resiliency of the material causes the extremities of the wing or ear portions 5 to spring into place behind the bead 10 so as to interlock therewith by a self-locking action, this being due to the fact that the wing or ear portions 5 of the attaching members 2 are arranged so that they cut across the arc of the bead 10 of the tire, as best understood from examination of Figure 1.

Now referring to the modification shown in Figure 4, the display device there indicated by the letter B is substantially the same as that illustrated in Figures 1 to 3 inclusive, except that it is not initially prescored at the line of juncture of the attaching member 2' with the body portion 1'. The device B is formed in its entirety from a single sheet of resilient material and shipped to point of use in flat condition, as before indicated. When it is desired to utilize the device B for display purposes the attaching members 2' are bent relative to the body portion 1' at an angle thereto along the line of juncture, indicated by the dotted line 12, of the neck portion 3' with the body portion 1' and the manner of insertion of the device B into the circular opening formed by the bead 10 of the tire 9 and the interlocking engagement of the wing portions 5' of the attaching members 2' of the device B, is the same as that described in reference to the display device illustrated in Figures 1 to 3 inclusive.

Now referring to the modified form of display device illustrated in Figures 5 and 6, the same, generally designated by the letter C, is formed of two parts, one part consisting of the circular body portion 13 suitably formed from a sheet of resilient material of the character previously referred to, and the other part consisting of an attachment portion indicated by the numeral 14, formed from a separate sheet of material and suitably secured to the back face of the body member 13. The part 14 may be formed of similar material and includes the attaching members 15 provided at either end thereof. The part 14 is suitably secured in flat relation to the back of the body member 13 except that the portions of the part 14 forming the attaching members 15 are unsecured to the body member 13 from a point extending inwardly of the periphery 16 of the body 13. In other words, the attaching members 15 are formed with neck portions 17, which in the initial flat position of the device B extend outwardly from the periphery 16 of the body 13 and also extend inwardly from the periphery 16 to the line of juncture with the rest of the part 14, so that the attaching members 15, including their neck portions 17, are not directly secured to the body 13 but may be bent relatively to the rest of the part 14 and the body 13. To facilitate this objective, part 14 is preferably prescored at 18 so as to enable bending of the attaching members 15 relatively to the rest of the part 14 so as to enable them to be disposed at an angle to the plane of the body 13. The portion of the part 14 between the crease scores 18 is, therefore, preferably glued or otherwise suitably secured in flat relation to the body 13 with the portions forming the attaching members 15 left unsecured to the body 13 so that they may be bent relatively thereto.

It will be seen that the attaching members 15 are provided with offstanding wings or ears 19 formed similarly to the ears 5 and 5' of the devices A and B previously described and the function and operation of the attaching members 15 is likewise the same as that previously described in reference to the other devices. Figure 6 illustrates the display device C in attached relation to the tire 9.

It will be understood that the outer face of the body of the display devices illustrated will carry advertising matter adversing the tires or other articles with which the display devices of my invention are associated.

From the foregoing it will be apparent that the display devices of my invention are of relatively simple construction which may be cheaply manufactured from cardboard or other suitable resilient material by means of a die-cutting operation and that the novel construction of the attaching members enables their association with the device to be advertised by means of simply adjusting the attaching members relative to the body portion and disposing the display device in position with a self-locking action of the attaching members with reference to the article in conjunction with which the display device is associated.

Having thus described my invention, what I claim as new and desire to secure by Letters Patent of the United States is:

1. A display device of the class described, comprising a display body portion of sheet material adapted for display of advertising material thereon, and a plurality of attaching members formed of resilient material, said attaching members comprising T-shaped tabs each having a neck portion movably connected to the body inwardly of and adjacent to the periphery of the body, said attaching members each having ears offstanding laterally from either side of the neck portion in the plane of the neck portion, the inner edges of said ears being disposed in a straight line, and said attaching members being movable to positions in which the entire plane of each attaching member is disposed at substantially right angles to the plane of said body with the inner edges of said ears extending parallel to the plane of said body and spaced from said body adjacent the periphery thereof, said body having a maximum dimension greater than the maximum dimension of the arcuate periphery of an opening in a supporting structure adapted to support the display device, whereby the display body will overlap said opening when engaged with the supporting structure outwardly thereof, the wings engaging behind the portion of the supporting structure forming the arcuate periphery of said opening to retain the display device supported on said structure when the display body is so engaged therewith and the attaching members are positioned as aforesaid.

2. A display device of the class described, comprising a display body portion of sheet material adapted for display of advertising material thereon, and a plurality of attaching members formed of resilient material, said attaching members comprising T-shaped tabs each having a neck portion movably connected to the body inwardly of and adjacent to the periphery of the body, said neck portion extending outwardly beyond the periphery of the body in initial condition, said attaching members each having ears offstanding laterally from either side of the neck portion in the plane of the neck portion and spaced outwardly from the periphery of the body in initial condition, the inner edges of said ears being disposed in a straight line substantially parallel to a line tangential to the periphery of said body in initial condition, and said attaching members being movable to positions in which the entire plane of each attaching member is disposed at substantially right angles to the plane of said body with the inner edges of said ears extending parallel to the plane of said body and spaced from said body adjacent the periphery thereof, said body having a maximum dimension greater than the maximum dimension of the arcuate periphery of an opening in a supporting structure adapted to support the display device, whereby the display body will overlap said opening when engaged with the supporting structure outwardly thereof, the wings engaging behind the portion of the supporting structure forming the arcuate periphery of said opening to retain the display device supported on said structure when the display body is so engaged therewith and the attaching members are positioned as aforesaid.

3. A display device of the class described, comprising a display body portion adapted for display of advertising matter thereon and a plurality of attaching members all formed as a unitary structure from a single sheet of resilient material, said attaching members comprising T-shaped tabs each having a neck portion extending outwardly beyond the periphery of the body in initial condition, said attaching members each having ears offstanding laterally from either side of the neck portion in the plane of the neck portion and spaced outwardly from the periphery of the body in initial condition the inner edges of said ears being disposed in a straight line substantially parallel to a line tangential to the periphery of said body in initial condition, the body portion being separated from each neck portion for a distance inwardly from the periphery of the body, and the attaching members being bendable relatively to the body portion along the line of juncture of each neck portion with the body portion to position each attaching member in a plane at substantially right angles to the plane of the body with the inner edges of said ears extending parallel to the plane of said body and spaced from the plane of said body adjacent the periphery thereof, said body having a maximum dimension greater than the maximum dimension of the arcuate periphery of an opening in a supporting structure adapted to support the display device, whereby the display body will overlap said opening when engaged with the supporting structure outwardly thereof, the wings engaging behind the portion of the supporting structure forming the arcuate periphery of said opening to retain the display device supported on said structure when the display body is so engaged therewith and the attaching members are positioned as aforesaid.

4. A display device of the class described, comprising a display body portion of sheet material adapted for display of advertising matter thereon, and a plurality of attaching members formed of resilient material, said attaching members comprising T-shaped tabs each having a neck portion movably connected to the body inwardly of and adjacent to the periphery of the body, said attaching members each having wings offstanding laterally from either side of the neck portion in the plane of the neck portion, the inner edges of said wings being disposed in a straight line, said attaching members being movable to positions in which the entire plane of each attaching member is disposed at substantially right angles to the plane of said body with the inner edges of said wings extending parallel to the plane of said body and spaced from said body adjacent the periphery thereof, said body portion being of a maximum dimension greater than the diameter of a circular opening in a tire casing or like supporting structure adapted to support the display device, whereby the display body will overlap the bead of the tire casing outwardly thereof when engaged therewith, the inner edges of said wings being arranged to cut across the arc of the periphery of said latter opening and engageable behind the bead of the tire casing to retain the display device supported on said casing when the display body is so engaged therewith and the attaching members are positioned as aforesaid.

JAMES T. MULLEN.

REFERENCES CITED

The following references are of record in the file of this patent:

UNITED STATES PATENTS

| Number | Name | Date |
| --- | --- | --- |
| 1,079,617 | Tennie | Nov. 25, 1913 |
| 1,392,337 | Kay | Oct. 4, 1921 |
| 1,809,298 | Heywood | June 9, 1931 |
| 1,986,550 | Ziemmerman | Jan. 1, 1935 |
| 2,149,959 | Gilbert | Mar. 7, 1939 |
| 2,177,947 | Riley | Oct. 31, 1939 |
| 2,517,884 | Kies | Aug. 8, 1950 |